United States Patent
Suni (10) Patent No.: US 10,790,909 B1
(45) Date of Patent: Sep. 29, 2020

(54) EFFICIENT MULTI-CHANNEL COHERENT OPTICAL SYSTEM

(71) Applicant: LOCKHEED MARTIN CORPORATION, Bethesda, MD (US)

(72) Inventor: Paul J. Suni, Berthoud, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 16/450,878

(22) Filed: Jun. 24, 2019

Related U.S. Application Data (60) Provisional application No. 62/845,754, filed on May 9, 2019.

(51) Int. Cl.
| | |
|---|---|
| *H04B 10/40* | (2013.01) |
| *H04B 10/50* | (2013.01) |
| *H04J 14/00* | (2006.01) |
| *H04B 10/61* | (2013.01) |
| *H04J 14/02* | (2006.01) |

(52) U.S. Cl.
CPC ........... *H04B 10/40* (2013.01); *H04B 10/503* (2013.01); *H04B 10/61* (2013.01); *H04J 14/002* (2013.01); *H04J 14/02* (2013.01)

(58) Field of Classification Search
CPC ..... H04B 10/503; H04B 10/61; H04J 12/002; H04J 14/02; H04J 14/002
See application file for complete search history.

(56) References Cited

U.S. PATENT DOCUMENTS

| | | | |
|---|---|---|---|
| 2013/0182620 A1* | 7/2013 | Chaffee | H04B 10/11 370/310 |
| 2016/0013609 A1* | 1/2016 | Doerr | H01S 3/10007 372/20 |
| 2016/0285558 A1* | 9/2016 | Abe | G02F 1/0123 |
| 2019/0386750 A1* | 12/2019 | Wang | H04B 10/07955 |

* cited by examiner

*Primary Examiner* — Dzung D Tran
(74) *Attorney, Agent, or Firm* — Morgan, Lewis & Bockius LLP (57) ABSTRACT

A coherent optical system includes an optical transmit (Tx) path, a coherent optical receive (Rx) path, and a multi-channel optical path coupled to the optical Tx path and the coherent optical Rx path. The multi-channel optical path includes a number of parallel-connected channels and a formatting optics block having an optical beam directed to a target. Each channel includes an optical amplifier, and the optical Tx path, the coherent Rx path, and the multi-channel optical path are realized as a photonic integrated circuit (PIC).

20 Claims, 9 Drawing Sheets

EFFICIENT MULTI-CHANNEL COHERENT OPTICAL SYSTEM

CROSS-REFERENCE TO RELATED APPLICATIONS

This application claims the benefit of priority under 35 U.S.C. § 119 from U.S. Provisional Patent Application 62/845,754 filed May 9, 2019, which is incorporated herein by reference in its entirety.

STATEMENT REGARDING FEDERALLY SPONSORED RESEARCH OR DEVELOPMENT

This invention was made with government support under Contract No. HR0011-16-C-0106 awarded by the U.S. government. The government has certain rights in the invention.

FIELD OF THE INVENTION

The present invention generally relates to photonic integrated circuits and, more particularly, to an efficient multi-channel coherent optical system.

BACKGROUND

Photonic integrated circuits (PICs) have the promise of exhibiting the same general utility as ordinary (i.e., electronic) integrated circuits at packing much functionality in a compact, lightweight and rugged package. However, instead of using electrical circuits interconnected by wires, they employ optical elements, connected by optical waveguides. In a PIC, functionalities of various optical sources, amplifiers, detectors, filters, switches, interferometers, gratings, electro-optic phase and amplitude modulators, splitters, combiners and/or other typical optical functionalities can be integrated into a small package.

Coherent optical systems are used for multiple types of applications, including laser radar, also known as lidar or ladar, and optical communications. Lidar systems can now be implemented using PICs, which are fabricated in a similar manner to electronic integrated circuits, in small dimensions. The small dimensions lead to limitations on how much optical power can be propagated before nonlinear optical effects set in or damage occurs. Silicon waveguides can support on the order of 100 mW, while silicon nitride can support higher powers, such as 1 W. Lidar systems implemented for stand-off ranges from hundreds of meters to many kilometers require much higher transmitted optical powers, such as several watts or substantially more. Scaling total system power levels to meet requirements for a long operating range cannot be achieved in PICs by conventional lidar architectures. Adding to the challenges is the fact that PIC components can be quite lossy.

Cascading multiple lossy components can lead to unacceptably high aggregate losses. In a monostatic lidar system where light is propagated through the system in both transmit and receive mode, the losses are doubled. For example, if a system incurs a 5 dB one-way loss, the roundtrip loss would be 10 dB. Using conventional architectures, this can only be compensated by increasing the laser power by 10 dB, or a factor of 10, which is normally impractical or impossible.

SUMMARY

According to various aspects of the subject technology, methods and configuration are disclosed for implementing a coherent optical system such as a laser radar (lidar) with an architecture that incorporates multiple optical amplifiers in the transmit/receive (T/R) path. The optical amplifiers can be, for example, semiconductor optical amplifiers (SOAs).

In one or more aspects, a coherent optical system includes an optical transmit (Tx) path, a coherent optical receive (Rx) path, and a multi-channel optical path coupled to the optical Tx path and the coherent optical Rx path. The multi-channel optical path includes a number of parallel-connected channels and a formatting optics block having an optical beam directed to a target. Each channel includes an optical amplifier, and the optical Tx path, the coherent Rx path and the multi-channel optical paths are realized as a photonic integrated circuit (PIC).

In other aspects, a method of transmitting and coherently receiving optical beams includes receiving, by a T/R switch, a Tx-path beam from a Tx path, and forwarding, by the T/R switch, the Tx-path beam to a multi-channel optical path including multiple optical amplifiers for propagation in a direction of a target. The method further includes receiving, by the T/R switch, an Rx-path beam from the multi-channel optical path and forwarding the Rx-path beam to a beam combiner of an Rx path, and combining, by the beam combiner, the Rx-path beam with a local-oscillator (LO) beam to recover an optical signal associated with the target.

In yet other aspects, a PIC includes an optical detector and a laser source coupled to an optical beam splitter. The PIC further includes an optical beam combiner coupled to the optical beam splitter; and a number of optical channels coupled to the optical beam combiner. Each optical channel includes a phase shifter, an optical amplifier and a folding element. The phase shifter is coupled to the optical beam combiner via a first waveguide. The optical amplifier is coupled to the phase shifter via a second waveguide. The folding element is coupled to the optical amplifier via a third waveguide. The folding element is coupled, via a spacer, to a microlens having a beam directed to a target. The optical beam splitter guides a portion of a light from the laser source, as an LO beam, into the optical detector, and the optical detector mixes an optical signal received from the optical beam combiner with the LO beam to recover an optical signal associated with the target.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

In some aspects of the present technology, methods and configuration are disclosed for implementing coherent laser radar (lidar) with an architecture that incorporates optical amplifiers in the transmit/receive (T/R) path. The disclosed solution can use, for example, semiconductor optical amplifiers (SOAs). The loss in photonic integrated circuit (PIC) due to concatenating multiple circuit elements may be made worse in lidars. In lidars, light from a laser source propagates forward through the system and exits to illuminate a target. Small amounts of scattered light may return to the lidar and propagate back through the system and are detected in an optical receiver. Consequently, losses in lidars can be effectively doubled. For example, if the single-pass power loss is about 10 dB (or a factor of 10), the double-pass power loss can be about 20 dB (or a factor of 100). In conventional lidar architectures, the only way to make up for these losses is to increase the laser power, which in many cases may become impractical to implement. In conventional lidar systems, the optical noise emanating from the amplifiers can, however, reduce the system efficiency more than the system gains from having the amplifier provide a power boost.

In high-loss systems, the situation may be different, as the system efficiency can be improved by placing the amplifiers appropriately in the system architecture. This enables reducing peak-power levels in PIC-based lidar systems to levels that cannot damage optical elements or cause nonlinear optical effects to impact system performance. This approach is particularly important in lidar architectures where a single laser beam is guided in a waveguide and then split into a multitude of channels. By placing SOAs in these channels, each channel can carry low power, but the total power in the system can be sufficiently high. For example, while a conventional architecture may require a laser power of 10 W to start with (which would easily damage waveguides), a distributed amplifier architecture of the subject technology can be constructed with the laser power not to exceed 100 mW, which does not damage waveguides. Because of the inherently high losses in PICs, the conventional systems are unlikely to be scalable to high powers. In stark contrast, the lidars of the subject technology can be scaled to high powers and large apertures.

The disclosed architecture fundamentally changes the operating characteristics of the lidar system. For example, any losses incurred upstream (toward the transmit laser) from the amplifier can effectively be nulled, and power scaling can be achieved by splitting the optical power among multiple channels, keeping the power in each channel below the limits imposed by nonlinear or damage effects. Since upstream losses can be nulled, but downstream losses cannot, it is desirable to place the amplifiers as far downstream as possible, ideally immediately before light exits the system. In cases where a system of this type is used as an optical phased array (OPA), a phase shifter (PS) is added to each channel to enable control of the relative optical phases of the individual channels. In this case, it is desirable to place the amplifier after the PS in order that PS losses do not impact the system link budget by degrading the carrier-to-noise ratio (CNR).

Figure 1A:
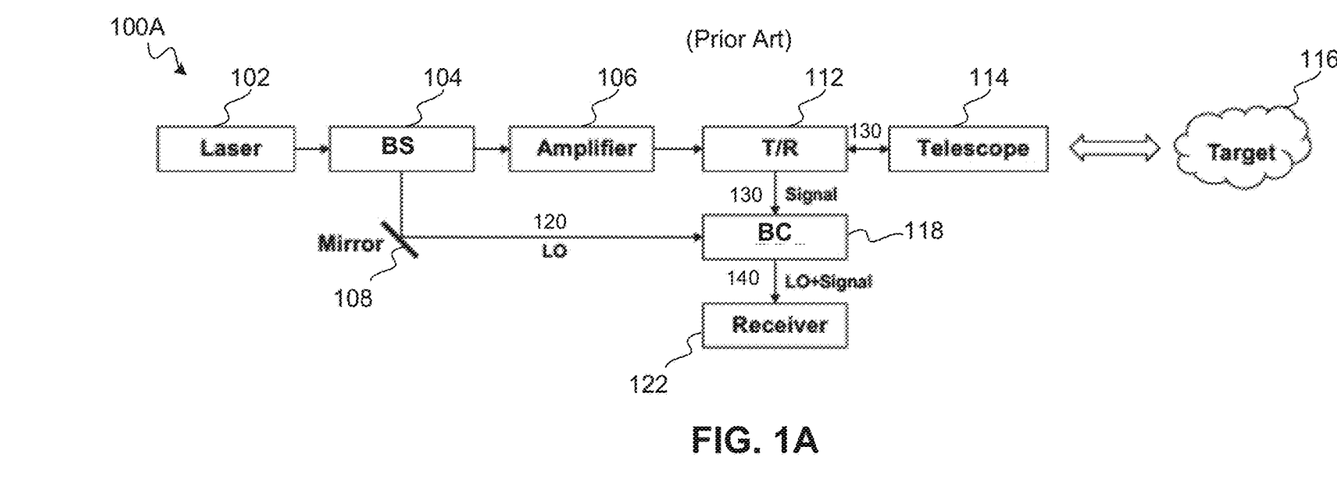
FIG. 1A is a block diagram illustrating an example architecture of a single-channel coherent lidar system.

FIG. 1A is a block diagram illustrating an example architecture of a single-channel coherent lidar system. The single-channel coherent lidar system 100A (hereinafter, lidar system 100A) includes a laser source 102, a beam splitter (BS) 104, an optical amplifier 106, a mirror 108, a T/R switch 112, a telescope 114, a target 116, a beam combiner (BC) 118 and an optical receiver 122. The laser source provides a laser beam that is split by the BS 104 into two branches. A first branch is forwarded to the optical amplifier 106 and the second branch is guided to the mirror 108. The first branch is a Tx beam that is amplified by the optical amplifier 106. The mirror 108 reflects the second branch to generate a local-oscillator (LO) beam 120 that is received by the BC 118. The T/R switch 112 receives the amplified Tx beam and forwards it to the telescope 114. The telescope 114 receives the amplified Tx beam and generates an output beam that is directed to the target 116, which is at a distance from the telescope 114.

In some implementations, the lidar system 100A is a lidar system and the target 116 scatters the output beam received from the telescope 114 back to the telescope 114. The telescope 114 collects the scattered beam and passes the collected beam (Rx beam) to the T/R switch 112 that guides the Rx beam as an Rx signal beam 130 to the BC 118. The BC 118 optically mixes the LO beam 120 with an Rx signal beam 130 received from the T/R switch 112 to generate an optical signal associated with the target 116. The optical receiver 122 converts the optical signal to an electrical signal. In some implementations, optical receiver 122 is implemented using a photo-detector, such as a photodiode.

In systems where different polarization states can be accommodated, the T/R switch 112 may include several components, such as a polarization beam splitter and a quarter-wave plate. When only one polarization state can be accommodated, the T/R switch 112 may be implemented with a simple beam splitter.

Figure 1B:
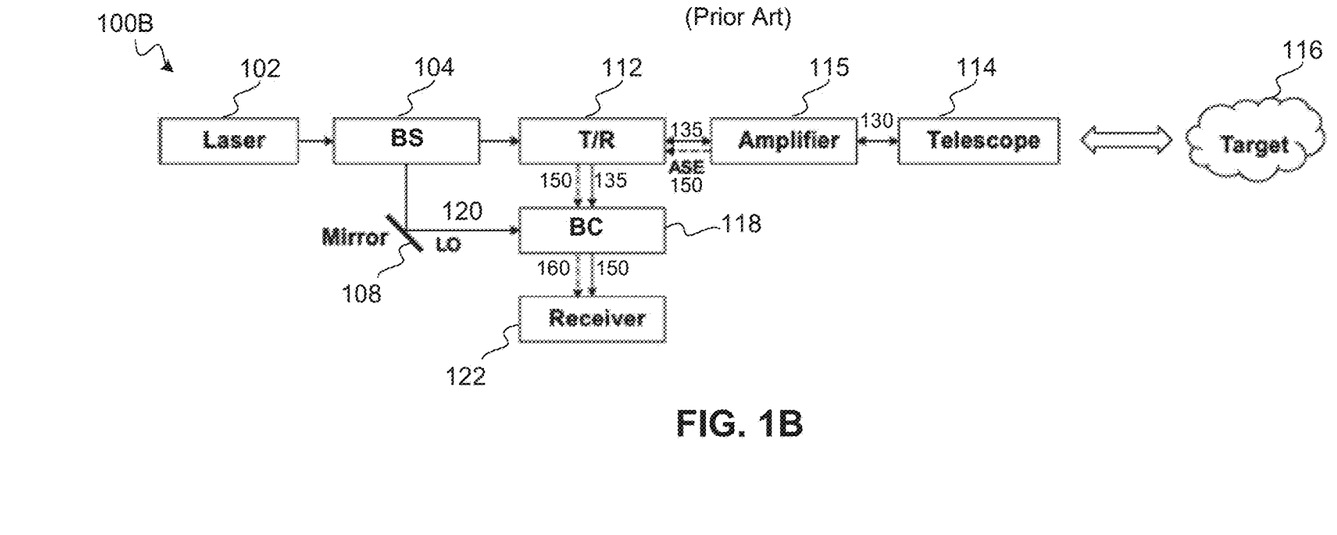
FIG. 1B is a block diagram illustrating an example architecture of a single-channel coherent lidar system.

FIG. 1B is a block diagram illustrating an example architecture of a single-channel coherent lidar system 100B. The single-channel coherent lidar architecture 100B (hereinafter, lidar system 100B) is similar to the lidar system 100A, except that the optical amplifier 106 of FIG. 1A is removed and an optical amplifier 115 is introduced after the T/R switch 112. The lidar system 100B has two advantages over the lidar system 100A. First, the Tx beam power can be boosted before transmission to the target 116. Second, the Rx signal beam 130 (return signal) can be amplified to form the Rx signal beam 135 before being mixed with the LO beam 120 at the BC 118. Although the amplification of the Rx signal beam 130 appears to be beneficial, nonetheless, the amplifier 115 also emits an amplified spontaneous emission (ASE) light 150 in the backward direction. This added noise to the Rx signal beam 135 can degrade performance of the lidar system 100B compared with a case where there is no ASE.

It is understood that in bulk optics implementations of these types of lidar systems, optical losses can generally be held low. In addition, bulk optics systems typically permit one to use multiple polarization states in the architecture design. This enables the T/R switch 112 to represent very low loss. As a result of these considerations, it is generally the case that low-loss design enables systems to perform better than systems in which the additional ASE noise contribution needs to be accounted for. The performance analysis of the lidar system 100B shows that the ASE impact is such that better-performing systems can be built without such post-T/R switch amplifiers.

For waveguide implementations, or more generally, PIC-based architectures, the situation is generally different from the bulk case. First, optical waveguides, particularly when implemented in silicon or similar materials, for example, silicon nitride or lithium niobate, cannot propagate high-optical powers without suffering from nonlinear optical effects or damage. Therefore, in PIC-based architectures, boosting power beyond about 1 Watt is not practical without such degradation. Second, it is difficult to efficiently propagate multiple polarization states in waveguides. For this reason, it is challenging, for example, to implement a low-loss T/R switch. This means that one has to generally implement a conventional beam splitter, typically in the form of an evanescent coupler or multimode interference (MMI) coupler. The optimal splitting ratio of a conventional beam splitter is about 50% transmission and 50% reflection, indicating that such devices incur an effective one-way loss of 3 dB, resulting in a 6 dB system efficiency loss in a roundtrip. For a given performance level, this loss, as well as other insertion losses associated with the T/R switch, have to be compensated by increasing the laser power by a factor of 4 (6 dB) or more as necessary, which is highly unattractive from a systems design perspective.

One attraction of PIC-based systems is that one can implement optical phased array (OPA) beam-steering, for example, by splitting a single waveguide carrying light into N channels and adding a phase shifter to each channel. Calibrating the relative phases, for example, by creating linear-phase shift gradients across the set of channels, enables lateral beam-steering, as discussed below.

Figure 1C:
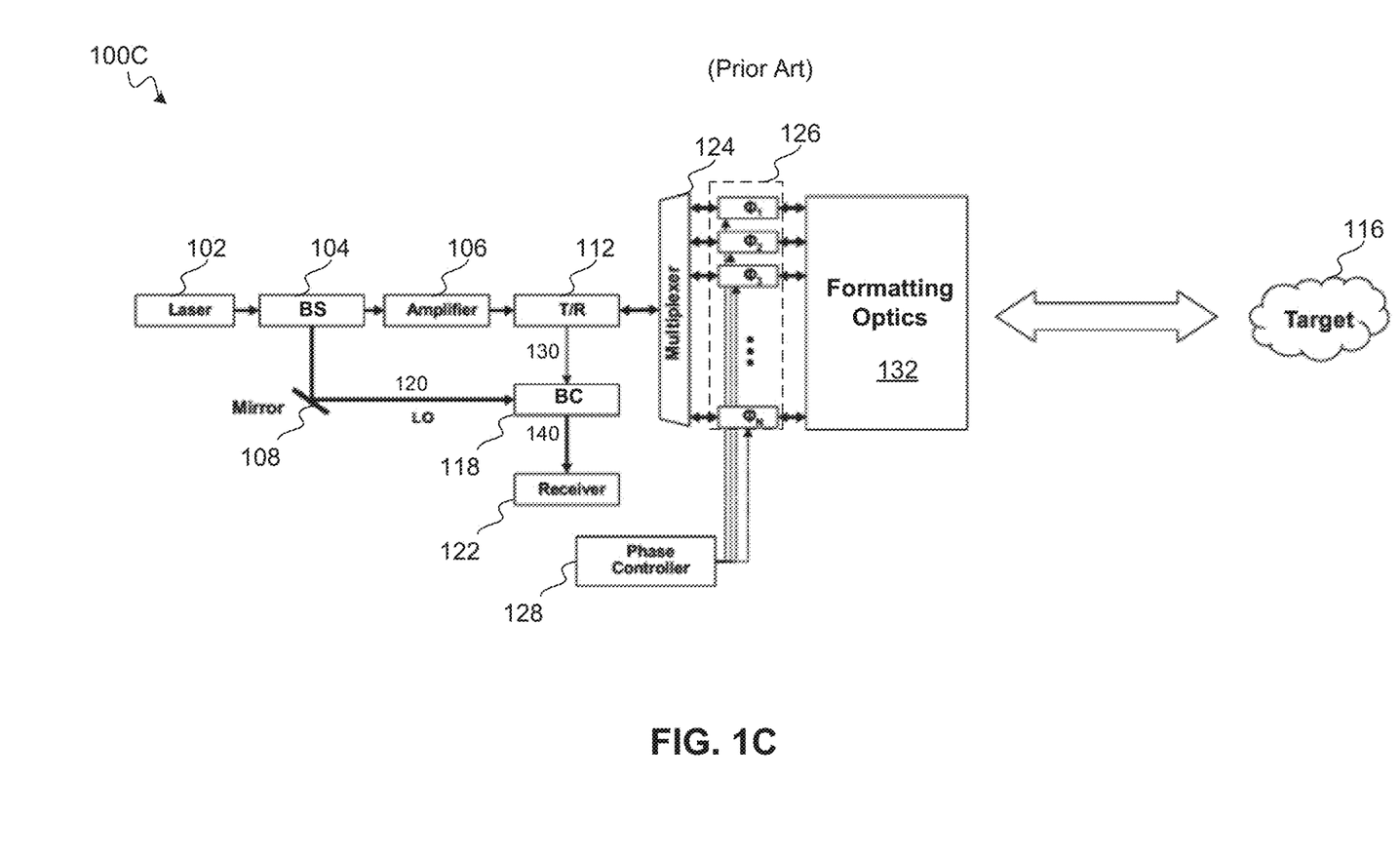
FIG. 1C is a block diagram illustrating an example architecture of a multi-channel coherent optical system.

FIG. 1C is a block diagram illustrating an example architecture of a multi-channel coherent optical system 100C. The multi-channel coherent optical system 100C (hereinafter, optical system 100C) is similar to the optical system 100A of FIG. 1A, except for the multi-channel feature that is implemented by a multiplexer 124, a phase shifter block 126, a formatting optics block 132, and a phase controller 128. The multi-channel feature of the optical system 100C allows for shaping the form of the beam exiting the optical system 100C, for example, to achieve a more or less circular or square beam. Without some beam shaping or formatting, a waveguide-based system would terminate as a linear array of waveguide apertures, which is frequently not ideal for propagation to a target (e.g., 116). The beam shaping is enabled by the addition of the multiplexer 124, the phase shifter block 126 and the formatting optics block 132. The phase shifter block 126 includes multiple phase shifters $\phi_1, \phi_2 \ldots \phi_N$, which are controlled by the phase controller 128. The phase controller 128 can control individual phases of the phase shifters $\phi_1, \phi_2 \ldots \phi_N$ to generate, for example, phase shifts with a linear gradient across the phase shifters $\phi_1, \phi_2 \ldots \phi_N$.

The problem with the optical system 100C is that the addition of the multiplexer 124 and the phase shifter block 126 would add power losses to the system. These losses can impact performance both in signal transmission and in signal reception of the system. For example, each dB of loss can reduce the system efficiency of the optical system 100C by about 2 dB. The subject technology solves this problem as discussed in more detail herein.

Figure 2:
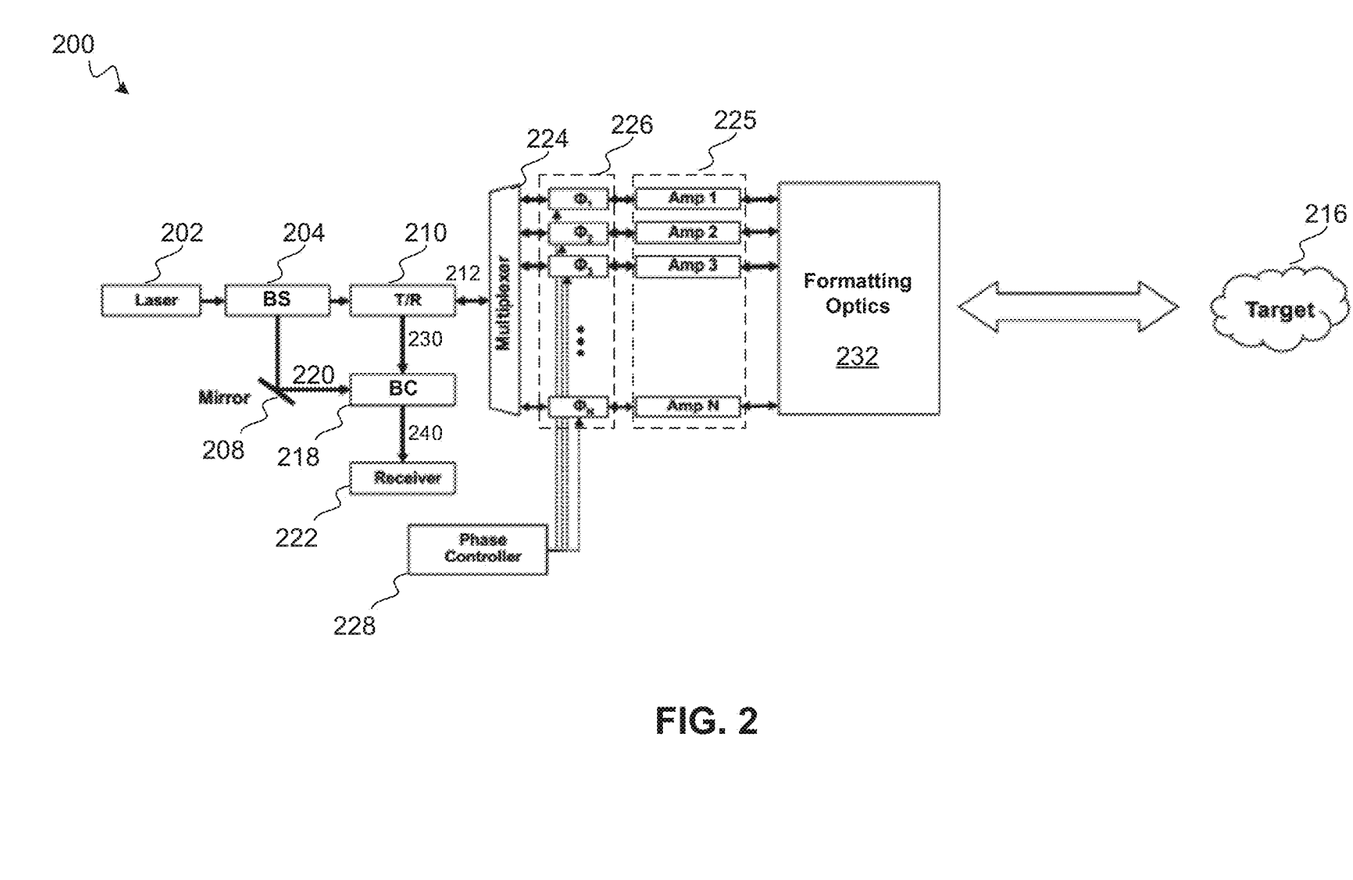
FIG. 2 is a block diagram illustrating an example of a multi-channel coherent optical system, according to certain aspects of the disclosure.

FIG. 2 is a block diagram illustrating an example of a multi-channel coherent optical system 200, according to certain aspects of the disclosure. The multi-channel coherent optical system 200 (hereinafter, optical system 200) includes a laser source 202, a BS 204, a T/R switch 210, a multiplexer 224, a phase shift block 226, an amplifier block 225, a formatting optics block 232, a mirror 208, a BC 218, a receiver 222 and a phase controller 228. The laser source 202, the BS 204 and the T/R switch 210 are, respectively, similar to the laser source 102, the BS 104 and the T/R switch 112 of FIG. 1A and form part of a Tx path which is continued by the multiplexer 224, the phase shift block 226, the amplifier block 225, and the formatting optics block 232. An LO path includes the mirror 208 that is similar to the mirror 108 of FIG. 1A and reflects a branch of the light beam generated by the laser source 202 to form a LO beam 220 guided to the BC 218. An Rx path includes the formatting optics block 232, the amplifier block 225, the phase shift block 226, the multiplexer 224, the T/R switch 210, the BC 218 and the receiver 222 that transfers an Rx signal (e.g., a lidar return signal) from the target 216 to the receiver 222.

In the Tx path, the multiplexer 224 divides a Tx beam 212 into multiple (N) beams that are passed through phase shifters $\phi_1, \phi_2 \ldots \phi_N$ of the phase shift block 226, amplifiers $Amp_1, Amp_2 \ldots Amp_N$ (e.g., SOAs) of the amplifier block 225 and the formatting optics block 232 to the target 216. The N phases of the phase shifters $\phi_1, \phi_2 \ldots \phi_N$ are controlled by the phase controller 228 to have, for example, a linear gradient. In some implementations, the phase controller 228 controls the phases of the phase shifters $\phi_1, \phi_2 \ldots \phi_N$ to be the same or to have another relationship. The amplifiers $Amp_1, Amp_2 \ldots Amp_N$ can have desired gains to compensate for the losses due to the multiplexer 224 and the phase shifters $\phi_1, \phi_2 \ldots \phi_N$ in the Tx and Rx paths. Analysis of the carrier-to-noise ratio (CNR) of the optical system 200 indicates that the enhancement in gain of the optical system 200 expressed as a ratio of the $CNR_{G\gg1}$ to $CNR_{G=1}$ is proportional to a gain G of the amplifiers $Amp_1$, $Amp_2$ . . . $Amp_N$ and is independent of a number of factors such as LO shot noise and the quantum efficiency of the photo-detector of the receiver 222. In the optical system 200, it is desirable to place the amplifier block 225 after the phase shift block 226, as shown in FIG. 2, and as close to the output of the optical system 200 as possible.

The formatting optics block 232 can be implemented, for example, by a number of optical gratings, as discussed in more detail herein.

Figure 3A:
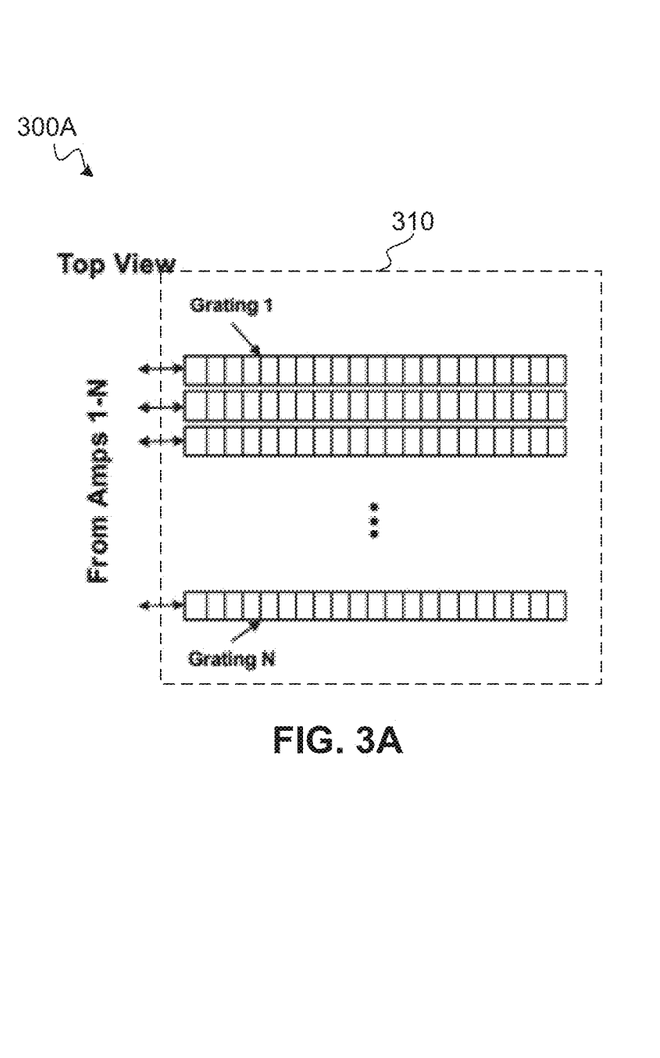
FIG. 3A is a schematic diagram illustrating a top view of an example implementation of a formatting optics block, according to certain aspects of the disclosure.

FIG. 3A is a schematic diagram illustrating a top view of an example implementation 300A of a formatting optics block, according to certain aspects of the disclosure. The example implementation 300A, shown in the top view depicted in FIG. 3A, is a realization of a formatting optics block (e.g., 232 of FIG. 2) by an optical grating block 310, which includes a number of (N) optical gratings. An input light beam to each optical grating is provided by an amplifier (e.g., SOA) of the amplifier block 225 of FIG. 2. The optical grating block 310 can shape the output light beam of the optical system 200, as shown in FIG. 3B below.

Figure 3B:
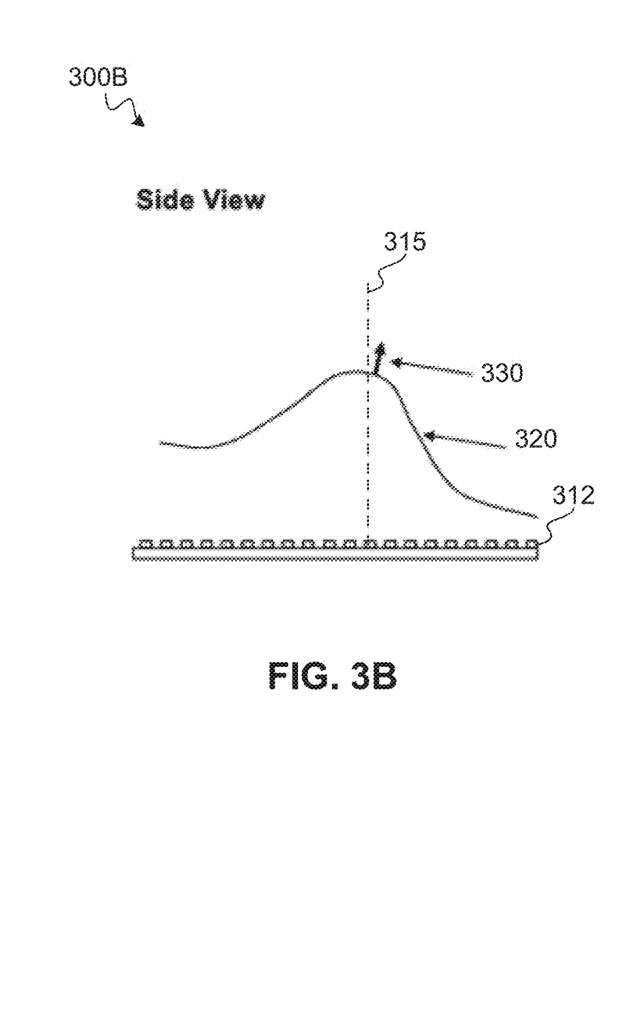
FIG. 3B is a chart illustrating an example light-propagation intensity profile along with a side view of the formatting optics block of FIG. 3A, according to certain aspects of the disclosure.

FIG. 3B is a chart illustrating an example light-propagation intensity profile 320 along with a side view 312 of the formatting optics block shown of FIG. 3A, according to certain aspects of the disclosure. For a particular wavelength of the light beam, the light-propagation intensity profile 320, generated by the optical grating block 310 of FIG. 3A, has a light-propagation direction 330 at an angle with respect to a normal 315 to the plane of the optical grating block 310 of FIG. 3A, which is controlled by the wavelength of the light generated by the laser source (e.g., 202 of FIG. 2). The change in phase gradients of the phase shifters of the phase shift block 226 of FIG. 2 can result in tilting the output beam of the optical system 200 into and away from the plane of FIG. 3B.

Figure 4A:
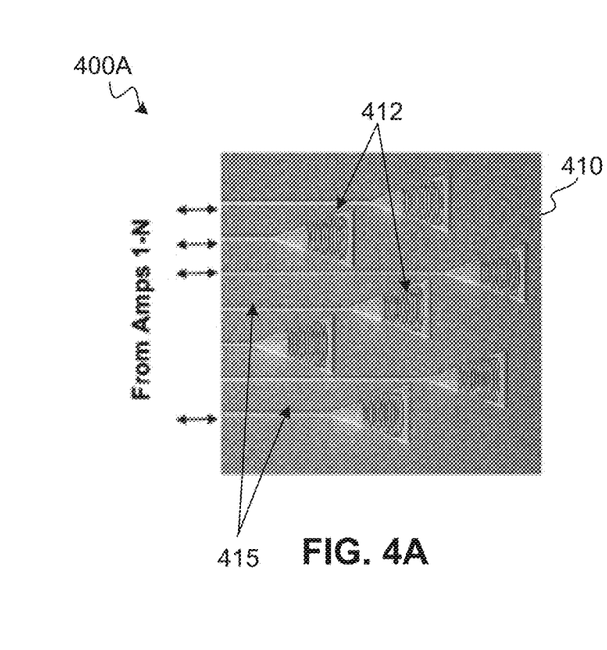
FIG. 4A is a schematic diagram illustrating a top view of an example implementation of a formatting optics block, according to certain aspects of the disclosure.

FIG. 4A is a schematic diagram illustrating a top view 400A of an example implementation 410 of a formatting optics block, according to certain aspects of the disclosure. The example implementation 410, shown in the top view 400A, includes a number of optical gratings 412 which are coupled via waveguides 415 to channel amplifiers of the amplifier block 225 of FIG. 2.

Figure 4B:
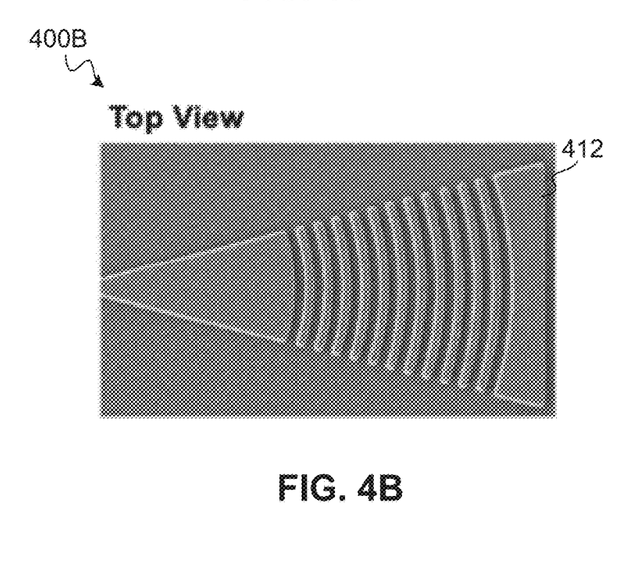
FIG. 4B is a schematic diagram illustrating a top view of an example grating of the formatting optics block of FIG. 4A, according to certain aspects of the disclosure.

FIG. 4B is a schematic diagram illustrating a top view 400B of an example grating of the formatting optics block of FIG. 4A, according to certain aspects of the disclosure. The top view 400B shows structural details of a single optical grating 412, the intensity profile of which is shown in FIG. 4C.

Figure 4C:
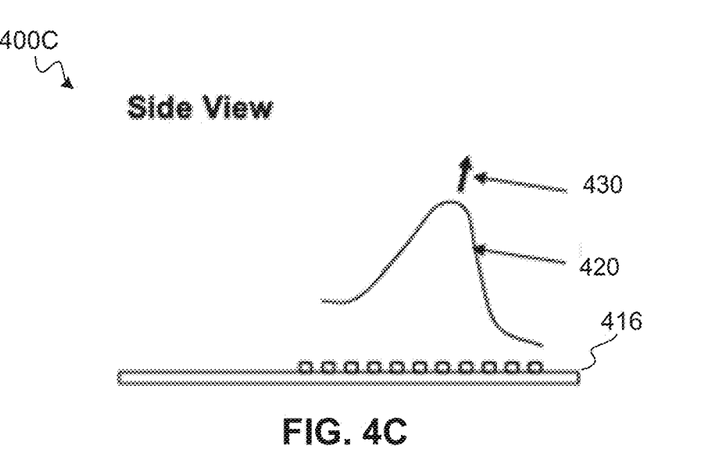
FIG. 4C is a chart illustrating an example light-propagation intensity profile along with a side view of the grating of FIG. 4B, according to certain aspects of the disclosure.

FIG. 4C is a chart illustrating an example light-propagation intensity profile 420 along with a side view 416 of the optical grating 412 of FIG. 4B, according to certain aspects of the disclosure. The light-propagation intensity profile 420, generated by the example implementation 410 of FIG. 4A, has a light-propagation direction 430 at a tilt angle with respect to a normal to the plane of the optical grating 412 of FIG. 4B. This tilt angle can be controlled by the wavelength of the light generated by the laser source (e.g., 202 of FIG. 2). The pointing direction of the beam from an array of optical gratings 412 (e.g., as in the example implementation 410) can be changed by varying the phase gradients of the phase shifters of the phase shift block 226 of FIG. 2.

Figure 5A:
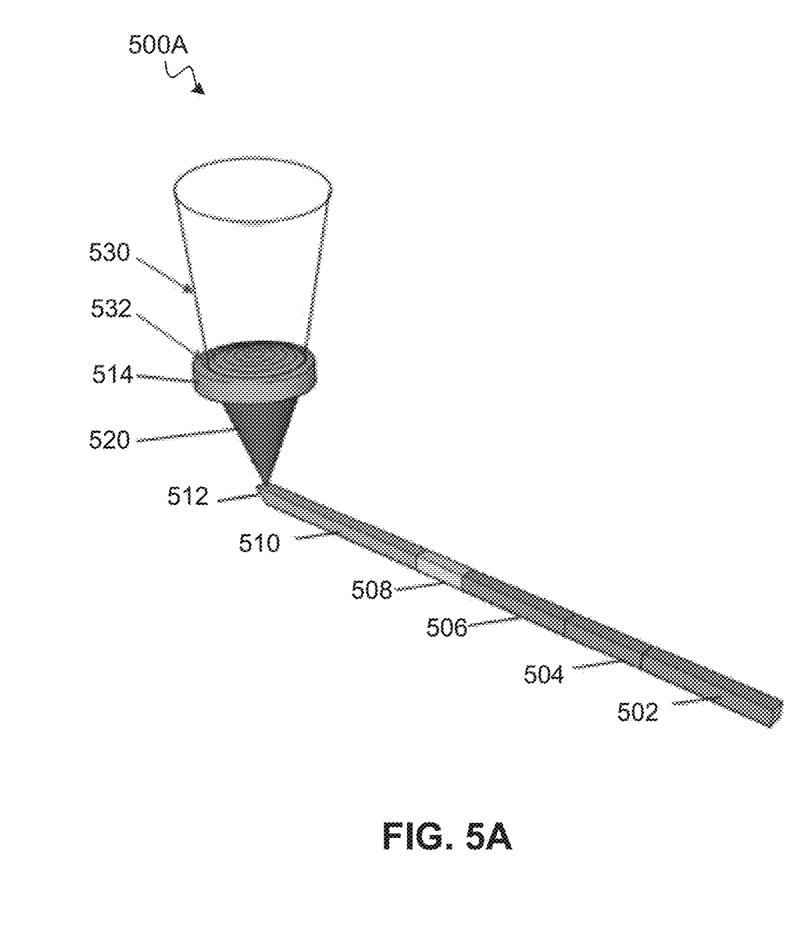
FIG. 5A is a schematic diagram illustrating a perspective view of a single channel of an example implementation of a multi-channel coherent optical system, according to certain aspects of the disclosure.

FIG. 5A is a schematic diagram illustrating a perspective view 500A of a single channel of an example implementation of a multi-channel coherent optical system, according to certain aspects of the disclosure. The single channel, as realized by the implementation shown in the perspective view 500A, includes a first waveguide 502, a phase shifter 504, a second waveguide 506, an optical amplifier 508, a third waveguide 510, a folding element 512 and a lenslet (microlens) 514. The waveguide 502 couples the phase shifter 504 to the multiplexer 224 of FIG. 2. The phase shifter 504 is a photonic phase shifter that can be implemented, for example, based on waveguides or photonic crystals. The optical amplifier 508 can be implemented as an SOA and the folding element 512 can be a mirror formed at the end of the third waveguide 510. The folding element can also be implemented using other optical devices, for example, the grating couplers (e.g., optical gratings 412 of FIG. 4A). The folding element 512 can form the limited light cone 530 with a bottom 532 coinciding with a surface of the lenslet 514.

Figure 5B:
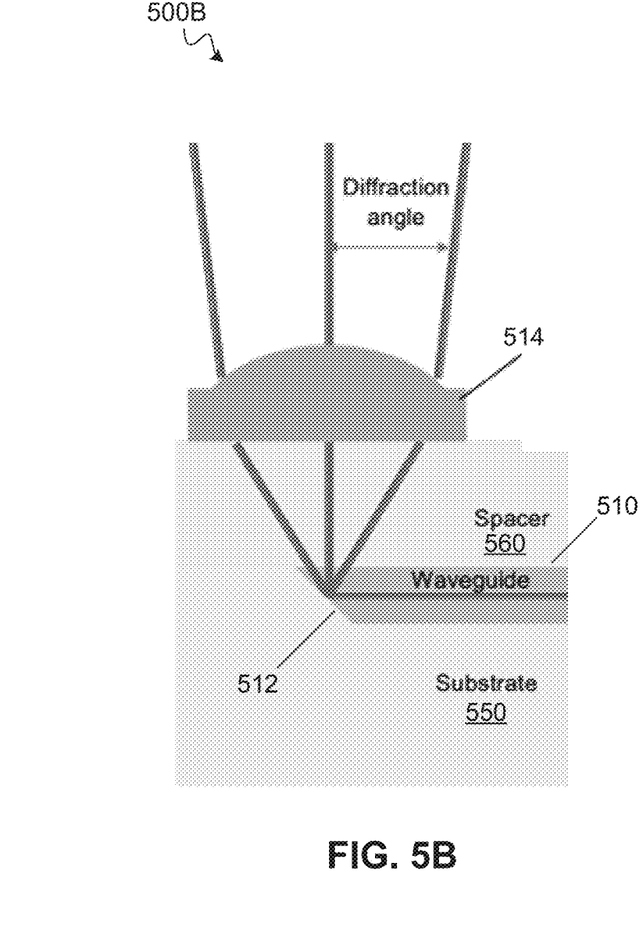
FIG. 5B is a schematic diagram illustrating a side view of a portion of the example implementation of the multi-channel coherent optical system of FIG. 5A, according to certain aspects of the disclosure.

FIG. 5B is a schematic diagram illustrating a side view 500B of a portion of the example single channel shown in FIG. 5A, according to certain aspects of the disclosure. In the side view 500B, the third waveguide 510, the folding element 512 and the lenslet 514 of the single channel depicted in the perspective view 500A of FIG. 5A are shown. The diffraction angle or divergence of the light cone 530 is defined by XII, where X is the wavelength of the light beam and D is diameter of the lenslet 514.

Figure 6:
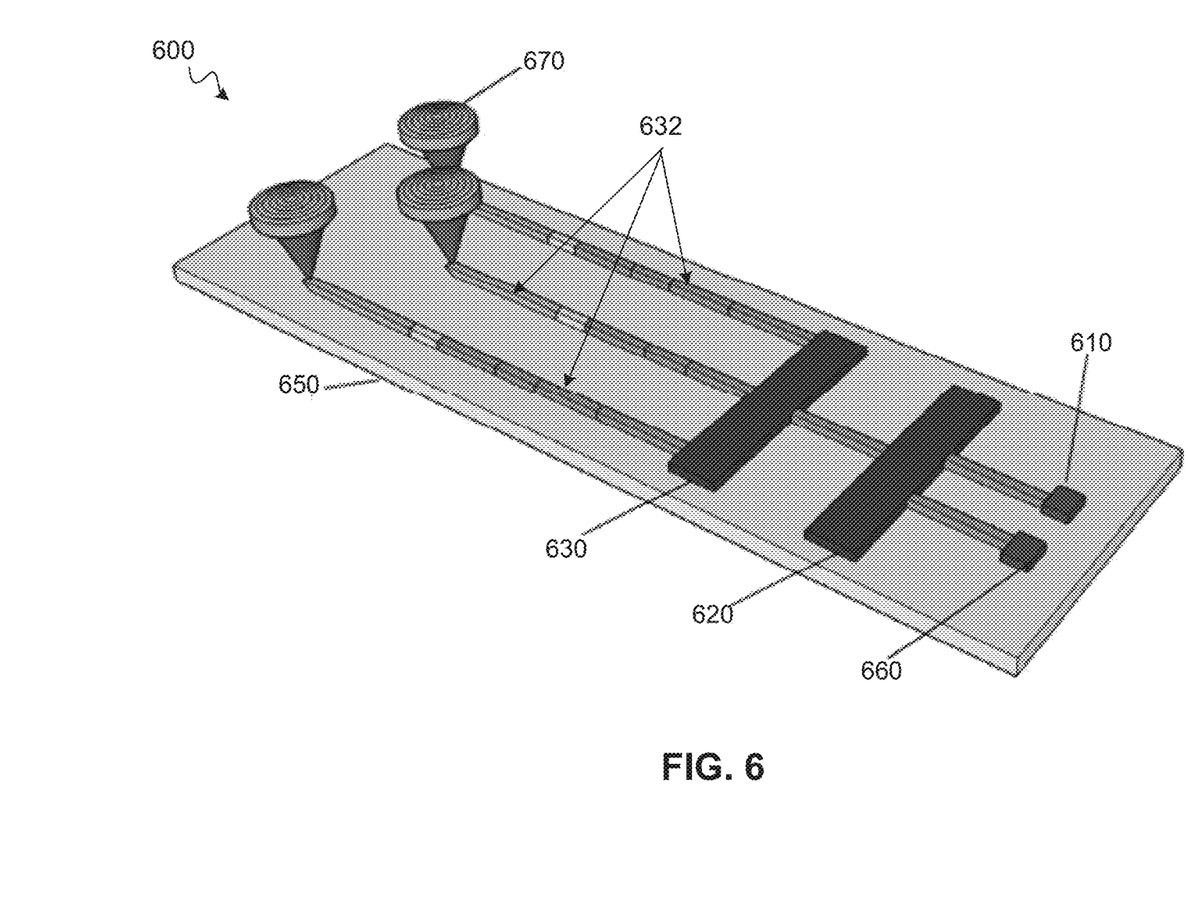
FIG. 6 is a schematic diagram illustrating a perspective view of an example implementation of a multi-channel coherent optical system, according to certain aspects of the disclosure.

FIG. 6 is a schematic diagram illustrating a perspective view of an example implementation of a multi-channel coherent optical system 600, according to certain aspects of the disclosure. The multi-channel coherent optical system 600 (hereinafter, optical system 600) is implemented on a substrate 650 (e.g., silicon or silica glass) and includes a laser source 610, a T/R switch 620, a multiplexer 630, a receiver 660 and multiple lenslets 670. The T/R switch 620 and the multiplexer 630 can be realized using an optical BS and an optical BC, respectively. The multiplexer 630 couples the T/R switch 620 to a number of channels 632, of which only three are shown in FIG. 6. Each channel 632 includes a phase shifter, an optical amplifier and the lenslet, as shown in FIG. 5A. The lenslet 670 is a subaperture, which together with lenslets of the other channels form an aperture of the optical system 600.

Figure 7:
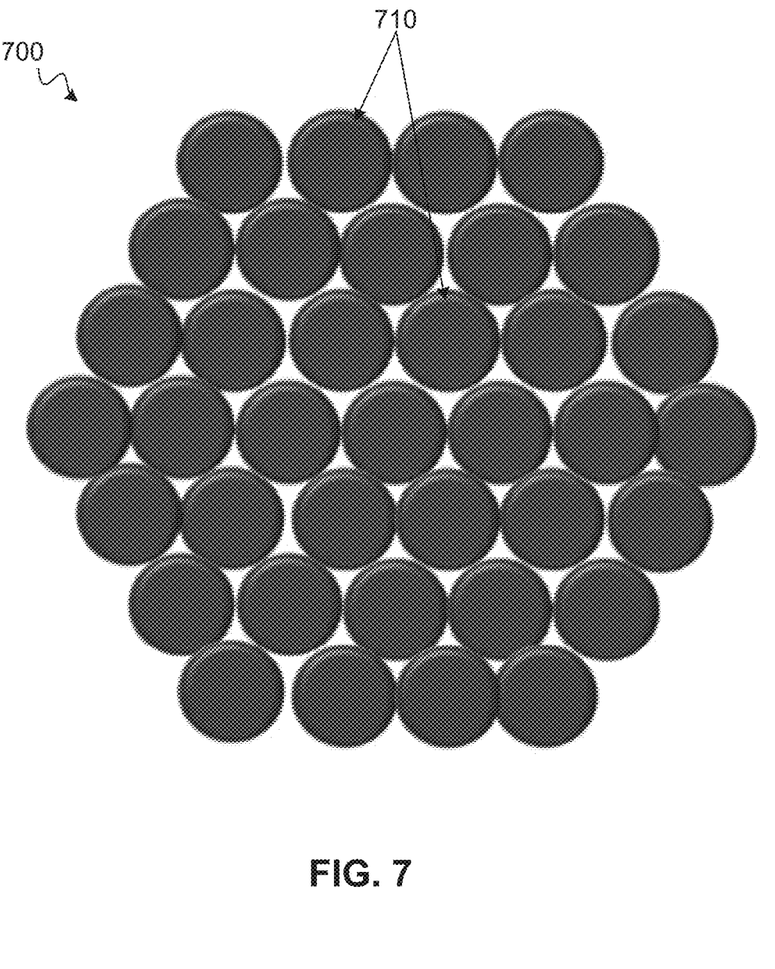
FIG. 7 is a schematic diagram illustrating a top view of an example lenslet array of a multi-channel coherent optical system, according to certain aspects of the disclosure.

FIG. 7 is a schematic diagram illustrating a top view of an example lenslet array 700 of a multi-channel coherent optical system, according to certain aspects of the disclosure. The lenslet array 700 includes a number (e.g., hundreds) of lenslets 710 that are arranged in a hexagonal aperture. In some implementations, the lenslets 710 can be arranged in another aperture shape, for example, a square aperture or a circular aperture.

Figure 8:
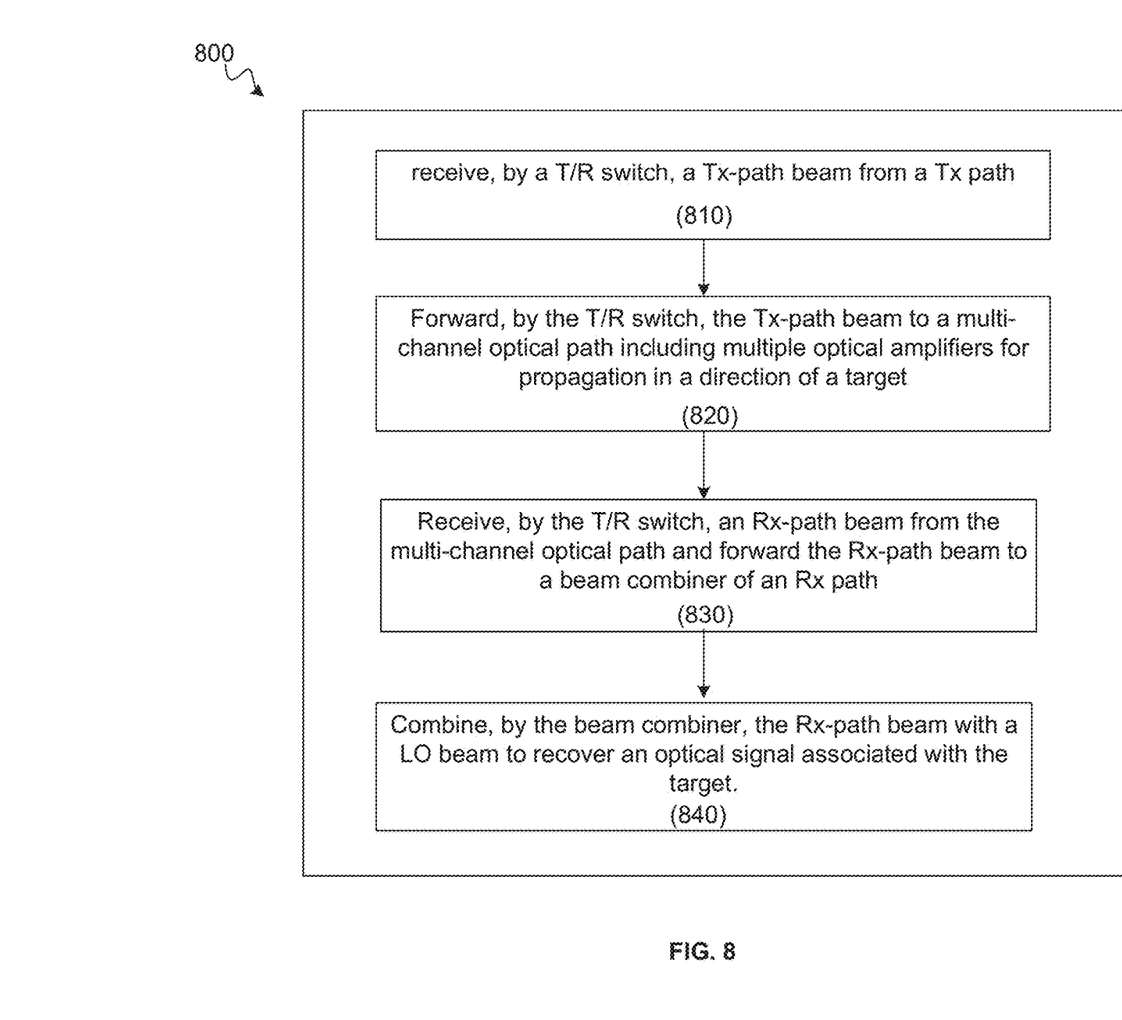
FIG. 8 is a flow diagram of a method of transmitting and coherently receiving optical beams, according to certain aspects of the disclosure.

FIG. 8 is a flow diagram of a method 800 of transmitting and coherently receiving optical beams, according to certain aspects of the disclosure. The method 800 starts with receiving, by a T/R switch (e.g., 210 of FIG. 2), a Tx-path beam (e.g., 212 of FIG. 2) from a Tx path (810). The method further includes forwarding, by the T/R switch, the Tx-path beam to a multi-channel optical path including multiple optical amplifiers (e.g., 225 of FIG. 2) for propagation in a direction of a target (e.g., 216 of FIG. 2) (820). An Rx-path beam is received by the T/R switch from the multi-channel optical path and forwarded (e.g., 230 of FIG. 2) to a beam combiner (e.g., 218 of FIG. 2) of an Rx path (830). The Rx-path beam is combined, by the beam combiner, with a LO beam (e.g., 220 of FIG. 2) to recover an optical signal (e.g., 240 of FIG. 2) associated with the target (840).

In some aspects, the subject technology is related to photonic integrated circuits, and more particularly, to free-space optical communication (FSOC) systems and coherent optical systems such as lidars, with an architecture that incorporates optical amplifiers in the transmit/receive path. In some aspects, the subject technology may be used in various markets, including, for example, and without limitation, sensor technology, next-generation electronics, and electronic markets.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meanings unless otherwise explicitly and clearly defined by the patentee. If there is any conflict in the usage of a word or term in this specification and one or more patent or other documents that may be incorporated herein by reference, the definition that is consistent with this specification should be adopted.

What is claimed is:

1. A coherent optical system comprising:
   an optical transmit (Tx) path;
   a coherent optical receive (Rx) path; and
   a multi-channel optical path coupled to the optical Tx path and the coherent optical Rx path,
   wherein:
   the multi-channel optical path includes a plurality of parallel-connected channels and a formatting optics block with an optical beam directed to a target,
   a channel of the plurality of parallel-connected channels includes an optical amplifier in between the formatting optics block and a phase shift block, and
   the optical Tx path, the coherent optical Rx path and the multi-channel optical path are realized as a photonic integrated circuit (PIC).

2. The coherent optical system of claim 1, wherein the multi-channel optical path is an N-channel duplex path and further comprises an optical multiplexer coupled to a transmit/receive (T/R) switch, wherein N is a positive integer.

3. The coherent optical system of claim 2, wherein the optical multiplexer is configured to split a Tx-path beam into N Tx-channel beams and combine N Rx-channel beams into an Rx-path beam.

4. The coherent optical system of claim 3, wherein the optical Tx path comprises a laser source, a beam splitter and a T/R switch, wherein the laser source is configured to generate a Tx-source beam, and the beam splitter is configured to split the Tx-source beam into a first beam and the Tx-path beam.

5. The coherent optical system of claim 4, wherein the coherent optical Rx path includes the T/R switch, a beam combiner and an optical receiver.

6. The coherent optical system of claim 5, further comprising a local-oscillator (LO) path including the beam splitter and a mirror.

7. The coherent optical system of claim 6, wherein the mirror is configured to reflect the first beam to provide an optical LO beam to the beam combiner.

8. The coherent optical system of claim 7, wherein the beam combiner is configured to mix the LO beam with the Rx-path beam to recover an optical signal associated with the target for processing by the optical receiver.

9. The coherent optical system of claim 1, wherein the plurality of parallel-connected channels further include N phase shifters controlled by a phase controller.

10. The coherent optical system of claim 9, wherein the phase controller is configured to control the N phase shifters to generate N linear-gradient phases.

11. The coherent optical system of claim 1, wherein the formatting optics block comprises a plurality of optical grating couplers configured to steer a Tx beam or an Rx beam of the coherent optical system.

12. A method of transmitting and coherently receiving optical beams, the method comprising:
- receiving, by a T/R switch, a Tx-path beam from a Tx path;
- forwarding, by the T/R switch, the Tx-path beam to a multi-channel optical path including a plurality of optical amplifiers for propagation in a direction of a target;
- receiving, by the T/R switch, an Rx-path beam from the multi-channel optical path and forwarding the Rx-path beam to a beam combiner of an Rx path; and
- combining, by the beam combiner, the Rx-path beam with a LO beam to recover an optical signal associated with the target,
- wherein the optical amplifiers are configured to amplify the Tx-path and Rx-path beams.

13. The method of claim 12, wherein the multi-channel optical path is an N-channel duplex path and further comprising an optical multiplexer coupled to the T/R switch, wherein N is a positive integer.

14. The method of claim 13, further comprising splitting, by a multiplexer, the Tx-path beam into N Tx-channel beams and combining, by the multiplexer, N Rx-channel beams into the Rx-path beam.

15. The method of claim 12, wherein the Tx path comprises a laser source, a beam splitter and the T/R switch, and wherein the method further comprises generating, by the laser source, a Tx-source beam, and splitting, by the beam splitter, the Tx-source beam into a first beam and the Tx-path beam.

16. The method of claim 15, further comprising an LO path including the beam splitter and a mirror, and wherein the method further comprises reflecting, by the mirror, the first beam to provide an optical LO beam to the beam combiner.

17. The method of claim 12, wherein the multi-channel optical path further includes N phase shifters controlled by a phase controller, and wherein the method further comprises controlling, by the phase controller, the N phase shifters to generate N linear-gradient phases.

18. A PIC comprising:
- an optical detector and a laser source coupled to an optical beam splitter;
- an optical beam combiner coupled to the optical beam splitter; and
- a plurality of optical channels coupled to the optical beam combiner, an optical channel of the plurality of optical channels comprising:
  - a phase shifter coupled to the optical beam combiner via a first waveguide;
  - an optical amplifier coupled to the phase shifter via a second waveguide; and
  - a folding element coupled to the optical amplifier via a third waveguide, wherein:
- the folding element is coupled, via a spacer, to a microlens having a beam directed to a target,
- the optical beam splitter is configured to guide a portion of a light from the laser source as an LO beam into the optical detector, and
- the optical detector is configured to mix an optical signal received from the optical beam combiner with the LO beam to recover an optical signal associated with the target.

19. The PIC of claim 18, wherein microlenses of the plurality of optical channels are arranged into a microlens array, wherein the microlens array comprises a circular array, a hexagonal array, a square array or a rectangular array.

20. The PIC of claim 18, further comprising a phase controller configured to control phase shifters of the plurality of optical channels to generate N linear-gradient phases, wherein N is a positive integer.

* * * * *